United States Patent
Giersiefer et al.

(10) Patent No.: US 10,988,166 B2
(45) Date of Patent: Apr. 27, 2021

(54) SYSTEM AND METHOD FOR ADAPTING STEERING TORQUE BASED ON A MOTOR VEHICLE PRESENT DRIVING SITUATION

(71) Applicant: Ford Global Technologies, LLC, Dearborn, MI (US)

(72) Inventors: Andreas Giersiefer, Leverkusen (DE); Patrick Glet, Cologne (DE); Christoph Klein, Nordrhein-Westfalen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/969,403

(22) Filed: May 2, 2018

(65) Prior Publication Data
US 2018/0319424 A1  Nov. 8, 2018

(30) Foreign Application Priority Data
May 3, 2017 (DE) .......................... 102017207391.8

(51) Int. Cl.
*B62D 15/02* (2006.01)
*B62D 6/10* (2006.01)
*B62D 5/04* (2006.01)

(52) U.S. Cl.
CPC ......... *B62D 5/0463* (2013.01); *B62D 5/0481* (2013.01); *B62D 6/10* (2013.01); *B62D 15/025* (2013.01)

(58) Field of Classification Search
CPC ...... B62D 5/0463; B62D 5/0481; B62D 6/10; B62D 15/025
See application file for complete search history.

(56) References Cited

U.S. PATENT DOCUMENTS

| 8,392,064 | B2 | 3/2013 | Thrun et al. |
| 9,327,765 | B2 * | 5/2016 | Takeda ................... B62D 6/003 |
| 9,527,527 | B2 * | 12/2016 | Lazic ....................... B62D 6/10 |

(Continued)

FOREIGN PATENT DOCUMENTS

| DE | 102004012144 A1 | 9/2005 |
| DE | 102006028610 A1 | 12/2007 |

(Continued)

OTHER PUBLICATIONS

Norm SAE J 3016 2014-01-00. Taxonomy and Definitions for Terms Related to On-Road Motor Vehicle Automated Driving Systems. S. 1-12, Jan. 16, 2014.

*Primary Examiner* — Alan D Hutchinson
*Assistant Examiner* — Andy Schneider
(74) *Attorney, Agent, or Firm* — Raymond L. Coppiellie; Burgess Law Office, PLLC

(57) ABSTRACT

A method for generating an auxiliary steering torque (AST) adapted to a present driving situation (PDS) of a motor vehicle using an active steering assistance system (SAS), including ascertaining the present driving situation (PDS); classifying the ascertained present driving situation (PDS) into at least one of a group of driving situation categories (DSC); and generating an auxiliary steering torque (AST) using the active steering assistance system (SAS). Wherein the amount and/or a time profile of the auxiliary steering torque (AST) depends on the classification of the present driving situation (PDS) into one of the driving situation categories (DSC).

7 Claims, 2 Drawing Sheets

(56) References Cited

U.S. PATENT DOCUMENTS

| | | | |
|---|---|---|---|
| 2002/0040265 A1* | 4/2002 | Sadano | B62D 5/0463 701/41 |
| 2006/0217860 A1 | 9/2006 | Ihara | |
| 2010/0030426 A1* | 2/2010 | Okita | B60T 7/22 701/41 |
| 2011/0245992 A1* | 10/2011 | Stahlin | B60W 50/085 701/1 |
| 2013/0211676 A1* | 8/2013 | Benyo | B62D 5/0463 701/42 |
| 2013/0238195 A1* | 9/2013 | Heitzer | B62D 1/286 701/42 |
| 2013/0245893 A1* | 9/2013 | Sprinzl | B62D 5/0481 701/42 |
| 2014/0032047 A1* | 1/2014 | Voelz | B62D 15/0255 701/41 |
| 2016/0121923 A1* | 5/2016 | Maeda | B62D 5/0463 701/41 |
| 2016/0129935 A1* | 5/2016 | Akatsuka | B62D 5/0463 180/446 |
| 2016/0152232 A1* | 6/2016 | Takahashi | B62D 15/025 701/41 |
| 2016/0244092 A1* | 8/2016 | Matsuo | B62D 6/002 |
| 2017/0066472 A1* | 3/2017 | Wang | B62D 5/0463 |
| 2017/0066473 A1* | 3/2017 | Yu | B62D 15/025 |
| 2017/0106903 A1* | 4/2017 | Moretti | B62D 6/00 |
| 2017/0253265 A1* | 9/2017 | Nishimura | B62D 7/159 |
| 2017/0355396 A1* | 12/2017 | Varunjikar | B62D 5/049 |
| 2018/0001927 A1* | 1/2018 | Howing | B62D 5/00 |
| 2018/0029640 A1* | 2/2018 | Otto | B62D 5/0463 |
| 2018/0127023 A1* | 5/2018 | Fuzes | B62D 5/0403 |
| 2018/0201307 A1* | 7/2018 | Kudo | B62D 1/28 |
| 2018/0201315 A1* | 7/2018 | Takamatsu | B60W 50/14 |
| 2018/0229769 A1* | 8/2018 | Mardh | B62D 1/286 |
| 2018/0237056 A1* | 8/2018 | Bremkens | B62D 5/0463 |
| 2018/0265120 A1* | 9/2018 | Mardh | B62D 5/0463 |
| 2018/0265123 A1* | 9/2018 | Mardh | B62D 5/0463 |
| 2018/0273087 A1* | 9/2018 | Schiebahn | B62D 1/286 |
| 2018/0281848 A1* | 10/2018 | Zegelaar | B62D 15/0265 |
| 2018/0354555 A1* | 12/2018 | Sheng | B62D 15/0255 |
| 2019/0023319 A1* | 1/2019 | Tyrrell | B62D 15/025 |
| 2019/0047619 A1* | 2/2019 | Toth | G01D 5/24476 |
| 2019/0071116 A1* | 3/2019 | Sasaki | B62D 5/049 |
| 2019/0126975 A1* | 5/2019 | Prahlad | B62D 5/0472 |

FOREIGN PATENT DOCUMENTS

| | | |
|---|---|---|
| DE | 102008056471 A1 | 11/2009 |
| DE | 102012211972 A1 | 1/2014 |
| WO | WO2003013940 A1 | 2/2003 |
| WO | WO2007009850 A1 | 1/2007 |

* cited by examiner

SYSTEM AND METHOD FOR ADAPTING STEERING TORQUE BASED ON A MOTOR VEHICLE PRESENT DRIVING SITUATION

CROSS-REFERENCE TO RELATED APPLICATIONS

Not Applicable.

BACKGROUND OF THE INVENTION

1. Field of the Invention

The invention relates generally to a vehicle having an active steering assistance system and, more specifically, a system and method for generating a steering torque adapted to a present driving situation of the motor vehicle.

2. Description of Related Art

Motor vehicles often include assistance systems to assist a driver. Such systems may include autonomous or partially autonomous systems, for example a steering assist system that adjusts a steering angle so a vehicle follows a road. Such systems may also provide information to the driver, including information relating to lane departure and adjacent or approaching vehicles.

Steering assist systems may include a steering actuator applying an assistance torque to the steering of the vehicle. The system may include a lane recognition system ascertaining information relating to the lane course, including sensors and other detectors to detect and maintain the vehicle on the roadway.

The systems may provide a characteristic curve for steering assistance according to a comparison between present movement data of a vehicle and acquired or estimated surroundings data.

Methods, systems, devices, and arrangements for automated assistance for a driver are known, and wherein driver decisions can be used as the basis of automated decisions of the system.

SUMMARY OF THE INVENTION

A method for generating an auxiliary steering torque including ascertaining and classifying a present driving situation into a driving situation category. Generating an auxiliary steering torque based on the present driving situation wherein in a first driving situation the auxiliary steering torque is an amount such that the motor vehicle follows an intended driving path, in a second driving situation the auxiliary steering torque increases based on a steering torque applied by a driver, in a third driving situation the auxiliary steering torque reduces based on a steering torque applied by the driver, and in a fourth driving situation the auxiliary steering torque is an amount such that the auxiliary steering torque does not fall below a predefined minimum value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The disclosed embodiments relate autonomous, partial automation, or partially autonomous vehicles.

Figure 1:
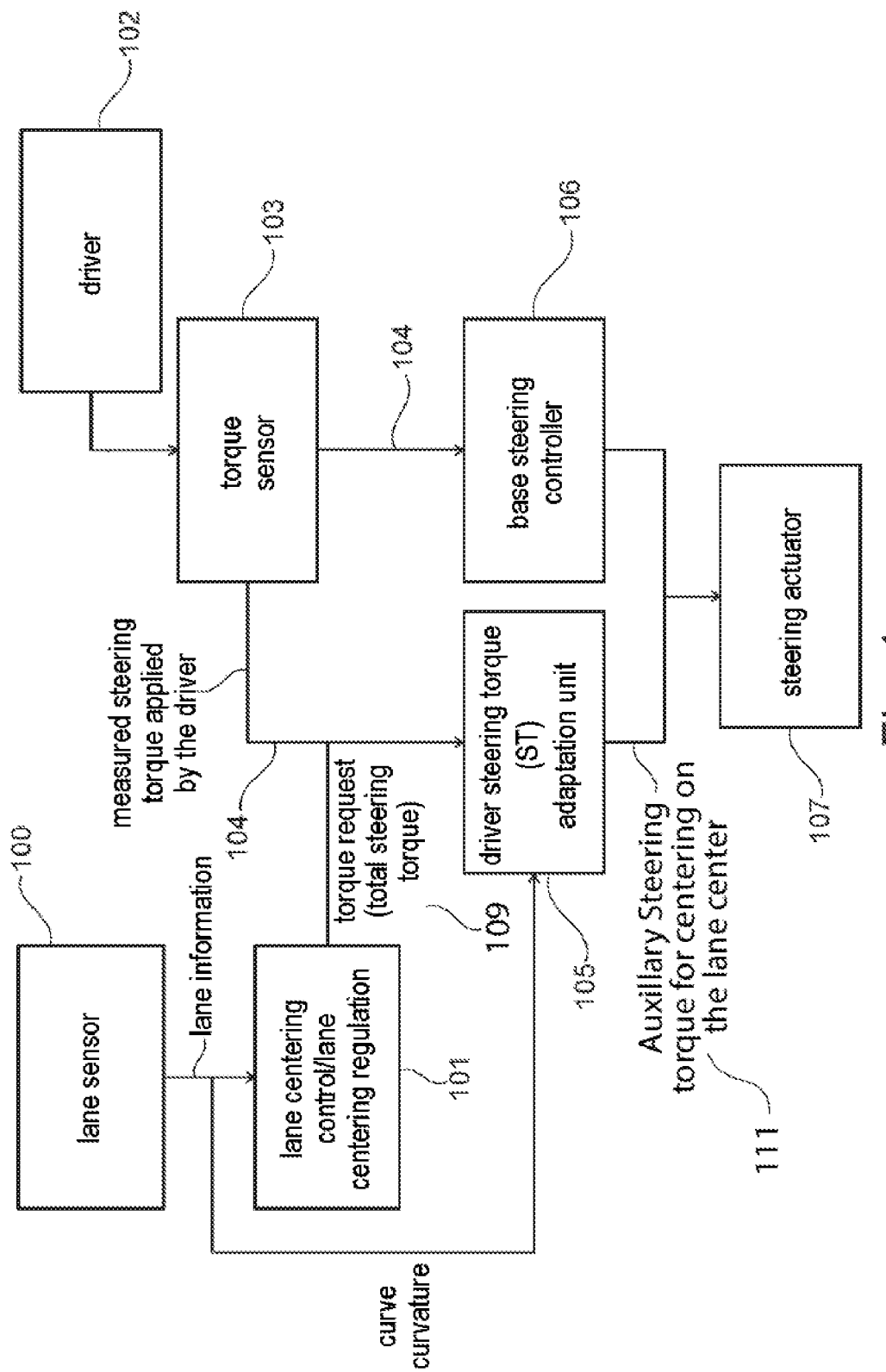
FIG. 1 is a flow chart of a method according to an embodiment of the invention.

FIG. 1 illustrates a method or sequence for an exemplary embodiment, shown by way of example as a flow chart. Initially, a lane sensor 100, ascertains lane information of an intended setpoint driving path 200, see FIG. 2. The lane information is relayed to a lane centering unit 101. A driver 102 inputs, typically by moving a steering wheel, a driver steering torque through a steering torque sensor 103. The torque sensor 103 outputs a measured driver steering torque 104 as an output signal, optionally with interconnection of a steering torque monitoring unit (not shown).

The lane centering unit 101 generates or outputs a required total steering torque (TST) 109, the required steering torque for guiding or moving the vehicle on the setpoint driving path 200. The driver steering torque (DST) 104 and the required total steering torque (TST) 109 are supplied to a driving steering torque adaptation unit 105. In parallel, the driver steering torque 104 measured by the steering torque sensor 103 is supplied by the steering torque sensor or a corresponding steering torque monitoring unit (not shown) to a steering actuation unit and/or steering regulating unit, shown as base steering controller 106.

The driver steering torque adaptation unit 105 outputs a value that corresponds to a reduced steering torque, composed, for example, from the difference of the required total steering torque (TST) 109 and the driver steering torque (DST) 104. The base steering controller 106 outputs at least one control/regulating command to a steering actuator 107. In addition, the driver steering torque adaptation unit 105 ascertains and outputs an auxiliary steering torque (AST) 111 for the purpose of centering the vehicle on the setpoint driving path 200. An actuation signal for the steering actuator 107 is formed from these values and actuates the steering actuator.

Figure 2:
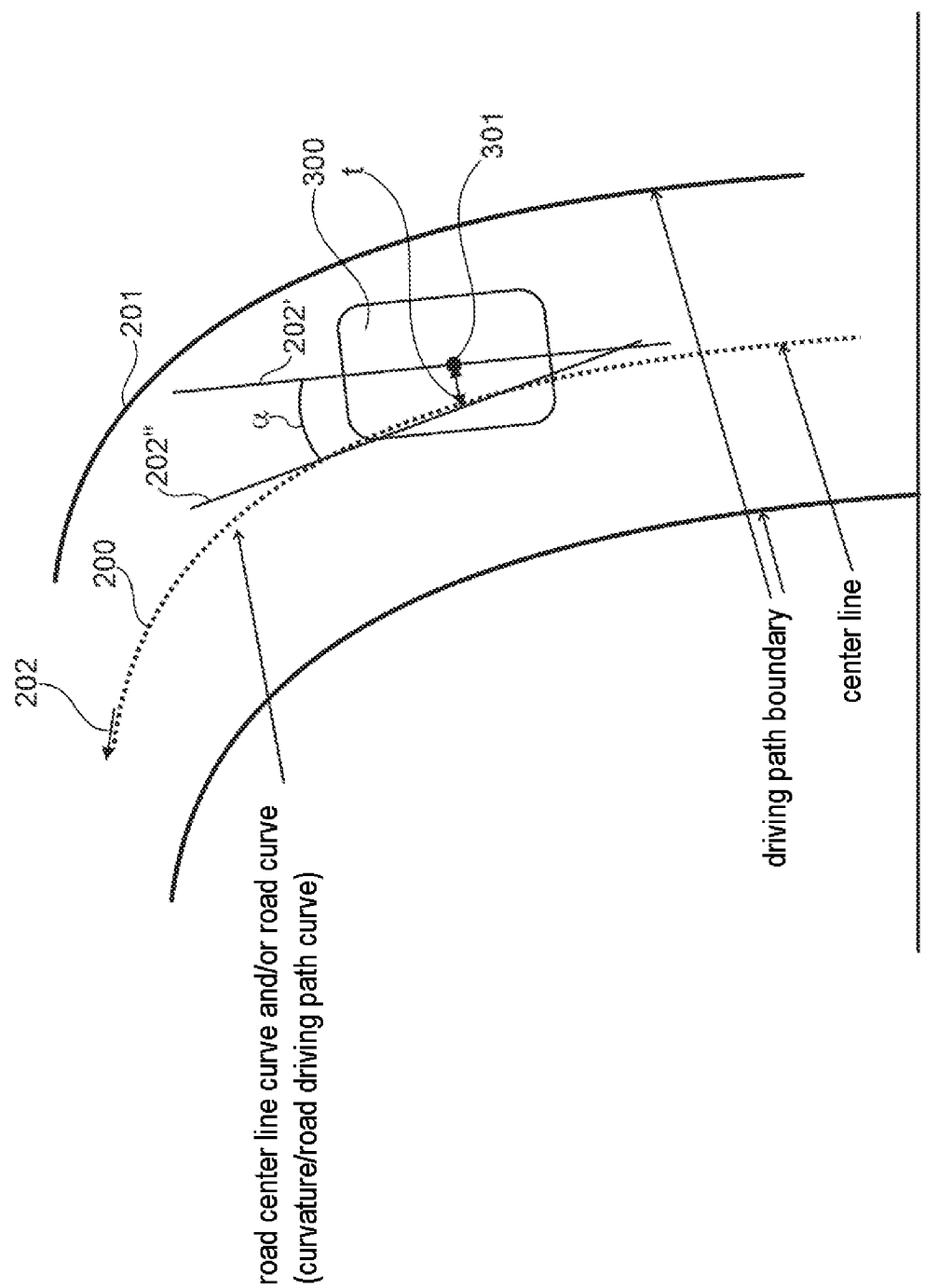
FIG. 2 is a schematic view of a driving path of a vehicle and driving situations resulting therefrom.

FIG. 2 is one example of a driving situation that can be resolved using the above-mentioned method and is one of many possible driving situations. The setpoint driving path 200 is shown, for example, as a centerline of a roadway 201 traveled by a motor vehicle 300. The setpoint driving path 200 has a driving path curvature, curved to the left in the present example in a travel direction 202. The single left-hand curve is shown as an example and the driving path may include a right-hand curve, a straight portion, or multiple combinations thereof. The vehicle 300, represented, for example, by its center of gravity 301, has a present travel direction (PTD) 202', which deviates from a desired or intended travel direction, and corresponds in the present driving situation (PDS) to the setpoint driving path 200 and is tangentially applied thereto. A tangent 202" on the intended driving path (IDP) can be used as a reference tangent to ascertain the present deviations (angle deviation a, lateral offset t). To determine the position of the tangent 202" on the intended driving path 200, for example, in a top view of the driving path and the vehicle, a vertical projection of the center of gravity 301 of the vehicle on the setpoint driving path 200 can be used. A projection point resulting therefrom on the intended driving path (IDP) is defined as the contact point or tangent 202". Therefore, by comparing the tangent 202" to the present travel direction 202', a lateral offset t and an angle deviation a of the vehicle, in the present state, with respect to the tangent 202" may be ascertained. Therefore, in relation to this tangent 202", the vehicle 300 or its center of gravity has a determinable angle deviation a and a determinable lateral deviation t. With the information of the lateral deviation t, this is a distance, and the angle deviation a, it can be computed which corrections with respect to the total steering torque (TST) are required to return the vehicle 300 from the present driving path, i.e., the present travel direction 202', onto the setpoint driving path 200.

This can be carried out, for example, as set forth in FIG. 1, using the lane centering unit 101 and the torque sensor 103.

Whether the required auxiliary steering torque (AST) 111 computed for the return of the vehicle 300 onto the setpoint driving path 200 is actually applied by the steering actuator 107 depends on the classification of a present driving situation (PDS); specifically, into different driving situation categories (DSC), for example—a driving situation without active action of a driver on the steering; a driving situation with a weak action of the driver on the steering; a driving situation with strong action of the driver in a direction against an expected total steering torque (TST); and a driving situation with a strong action of the driver on the steering in a direction oriented the same as an expected total steering torque (TST). Possible reactions or non-reactions, i.e., possible application of auxiliary steering torques (AST) with respect to amount or direction depends on which driving situation category (DSC) the present driving situation (PDS) was classified in. It is then determined therefrom whether and, if so, to what level the auxiliary steering torque (AST) is applied by the steering actuator 107.

Overall, the system is a steering system, suitable for a partially autonomously driving vehicle or a vehicle driving in a partially automated manner according to category 2 (level 2) of the category table according to SAE standard J3016, January 2014. This table specifies the requirements for various degrees of automation or autonomy in categories 0 to 5. Category 0 corresponds in this case to a vehicle operated completely without assistance and autonomy units. Category 5 relates to a vehicle driving in a fully autonomous manner, in which the driver has no influence options on the driving operation of the vehicle, with the exception of turning the vehicle on and off.

Category 2 of the above-mentioned SAE standard J3016 is defined as follows in a descriptive manner: Driving-mode specific engagement by a driver assistance system, either of the type of steering assistance or an acceleration/brake assistant using items of information about the driving surroundings and with the expectation that the human driver will execute all remaining aspects of the dynamic driving state.

Automated systems are provided with respect to the execution of the steering and the acceleration/braking of the vehicle. The human driver is responsible with respect to the observation of the driving surroundings and/or the vehicle surroundings. The human driver is also responsible as a fallback solution for a dynamic driving intervention. Only a few driving modes are provided as system performance data (driving modes).

The foregoing system and method adapts a steering assistance torque, perceptible or perceived by the driver, to a pleasant degree when the driver interacts with or uses a driver assistance system.

The perceived or perceptible assistance torque is reduced if the driver actively controls against the partially automated driver assistance system to maintain a natural steering feeling. However, a specific minimum steering assistance torque is to be maintained for the driver, to provide feedback about the correct activity of the steering assistance system of the driver assistance system. In particular, a solution is specified such that an adequate assistance of the driver takes place to overcome transverse movements during cornering.

The system and method enables a reduction of the assistance steering torque, applied by an automated assistance system, and which the driver feels at the steering wheel.

A simple override of the steering system by the driver is enabled, to transfer the control of the vehicle to the driver or transfer the control back to the driver in a simple manner and with a reliable process.

Furthermore, a natural steering feeling is to be provided to the driver, when using an automated or in particular a partially automated assistance system. Along with providing steering assistance in curves, to assist the driver.

As a further measure, it is provided that the steering assistance torque be increased slowly, when the driver reduces the steering torque applied by the driver to the steering wheel.

Finally, the steering assistance torque is increased if the driver suddenly releases the steering wheel, for example.

In vehicles, driving path recognition systems, for example front cameras, and electrically assisted steering systems can be installed to monitor the transverse movement of the vehicle. Such systems are designed to assist the driver, but not to control the vehicle in an automated and completely autonomous manner. The driver is even warned by such systems if they release the steering wheel for a specific time span.

These requirements result in a goal conflict, since the transverse movement system typically wants to keep the vehicle on a desired centerline of a driving path, while in contrast the driver can desire to go to another destination. The driver feels the assistance of the system, without being obstructed during the control of the vehicle because of a dependence on the assistance system. Such vehicles or assistance systems typically have a sensor for the transverse movement or transverse acceleration of a vehicle. Such a sensor for the transverse movement/transverse acceleration of the vehicle estimates the characteristic of the road in front of the vehicle and estimates a deviation of the vehicle in relation to the optimum driving path. A control function computes, based on such signals of the sensor, an assistance steering torque, which is applied by the electrically driven steering system.

A component or a portion of the torque computed by the transverse movement control unit is based on the curvature of the road in front of the vehicle, while in contrast another portion or another component is based on an angle error and/or a lateral offset of the vehicle in relation to the optimum driving path. The optimum driving path is typically a centerline of a roadway to be traveled.

An assistance steering torque results therefrom, ascertained by the lateral movement control unit from the total of T(error) and T(curve).

The component T(error) is understood as the assistance steering torque component that results from an already existing deviation, angle deviation, and/or lateral offset from the desired driving path. The assistance steering torque portion T(curve) is the steering torque portion that results from the present curvature or curve of the road in front of the vehicle. If the vehicle were on the ideal or desired driving path, the assistance steering torque portion T(curve) would thus cause a movement of the vehicle along the desired driving path. An additional portion T(error) because of an already existing deviation error (angle deviation and/or lateral offset) would be zero in such a case.

To provide an optimum steering assistance for the driver in different driving situations, the system must differentiate or be able to differentiate between different driving situations. Such driving situation categories (DSC) to be differentiated include: driving without action of the driver; driving with a light or weak action of the driver on the steering system; driving with an intensive/strong action of the driver against the direction actually provided by the steering assistance system; and driving with a strong action of the driver in the same direction which the active steering assistance system provides. The latter occurs in particular when driving through a curve with assistance of the driver during steering.

With respect to the first driving situation category, the goal of the transverse movement control unit without engagement of the driver is to move the vehicle on the computed, i.e., desired driving path with the smallest possible, i.e., minimal lateral offset.

With respect to the second driving situation, the system provides a feeling for the driver of guided driving, i.e., assisted driving, if the driver only interacts lightly or weakly with the system, i.e., the steering wheel. This means the driver feels an assistance steering torque via the steering wheel, which suggests to the driver or directs the driver to steer toward the optimum driving path.

With respect to the third driving situation category, if the interaction of the driver becomes stronger or more intensive and the driver actively influences the driving path of the vehicle, the steering assistance torque is reduced based on the error signals. This takes place depending on the steering torque applied by the driver if the driver acts, for example, against the computed specifications of the transverse movement control system. If the driver steers in the same direction as the transverse movement system, the auxiliary steering torque is not reduced, in order to provide the greatest possible steering assistance to the driver.

In the case of the fourth driving situation category, the steering torque component of the assistance system, i.e., the auxiliary steering torque, resulting from the road curvature is not reduced because of an existing driver action, to create a lesser effort for applying a steering torque by the driver in every driving situation. Instead, the driver effort for applying the required overall steering torque is reduced in relation to a normal driver experience of the driver by the lateral movement control system.

As set forth above, according to an SAE standard J3016, published in January 2014 (SAE international's J3016, January 2014), different categories of driving automation are defined for road vehicles. A total of five categories (category 0 to category 5) are defined therein. Category 0 represents "no automation"; category 5 represents full driving automation. The present exemplary embodiment relates to a refinement of so-called category 2 (level 2) relating to automated driving.

Specifically, embodiment includes a method for obtaining an auxiliary steering torque (AST) adapted to a present driving situation (PDS) of a motor vehicle with use of an active steering assistance system (SAS) including the steps of ascertaining the present driving situation (PDS); classifying the ascertained present driving situation (PDS) into at least one of a group of four driving situation categories (DSC); and generating an auxiliary steering torque (AST) by means of the active steering assistance system (SAS), wherein the amount and/or a time profile of the auxiliary steering torque (AST) is produced depending on the classification of the present driving situation (PDS) in one of the driving situation categories (DSC).

In one preferred embodiment of the method, the driving situation categories (DSC) include a group of four driving situation categories (DSC)—a first driving situation without active action of a driver on the steering; a second driving situation with a weak action of the driver on the steering; a third driving situation with strong action of the driver in a direction against a total steering torque (TST) to be expected; and a fourth driving situation with a strong action of the driver on the steering in a direction oriented in the same direction to the total steering torque (TST) to be expected.

Such a categorization has proven to be advantageous to be able to classify a rough overview of the required auxiliary steering torques (AST) of the steering assistance system (SAS) with respect to the direction, amount, and general presence thereof.

In a further embodiment of the invention, the ascertainment of the present driving situation (PDS) includes ascertaining a required total steering torque (TST), which is necessary to move the motor vehicle along an intended driving path (IDP) and measuring a driver steering torque (DST), which is applied by the driver.

In a further embodiment, the method includes the generation of the auxiliary steering torque (AST), carried out such that upon the presence of a driving situation according to the first driving situation, the auxiliary steering torque (AST) in an amount such that the motor vehicle follows the intended driving path; upon the presence of a driving situation according to the second driving situation, the auxiliary steering torque (AST) is an amount such that the driver feels at least one direction of the auxiliary steering torque (AST) required to achieve the required total steering torque (TST); upon the presence of a driving situation according to the third driving situation, the auxiliary steering torque (AST), which is applied by the steering assistance system (SAM), is reduced the stronger the driver steering torque (DST) applied by the driver is; and upon the presence of a driving situation according to the fourth driving situation, the auxiliary steering torque (AST) is an amount such that the auxiliary steering torque (AST) does not fall below a predefined minimum value to give the driver at least the information that a steering torque assistance is active. The minimum value can vary depending on the present travel velocity and/or depending on the present curvature of the driving path.

By way of these measures, a simple, pragmatic, and appropriate assignment of the amount, the direction, and the presence of an auxiliary steering torque (AST) to the various driving situation categories (DSC) is achieved.

A further embodiment of the invention is distinguished in that, to ascertain the required total steering torque (TST) at least one curvature of the intended driving path (IDP) and a present lateral deviation of the motor vehicle from the driving path and/or an angle deviation of the present driving path from the desired driving path is ascertained. The total steering torque (TST) which is necessary to move the motor vehicle along the intended driving path (IDP) includes a steering torque portion resulting from the deviation of the present driving path (PDP) in relation to the intended driving path (IDP) and from a steering torque portion that results from the curvature of the intended driving path (IDP).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for generating an auxiliary steering torque adapted to a present driving situation of a motor vehicle comprising:
    ascertaining the present driving situation;
    classifying the ascertained present driving situation into at least one of a group of four driving situation categories;
    generating an auxiliary steering torque, wherein an amount or time profile of the auxiliary steering torque is produced depending on the classification of the present driving situation in one of the four driving situation categories;
    a first driving situation wherein the auxiliary steering torque maintains the vehicle on an intended driving path, a second driving situation wherein the auxiliary steering torque is applied in the same direction as a driver torque and sum together to achieve a required total steering torque; a third driving situation wherein the auxiliary steering torque is reduced based on a driver steering torque; and a fourth driving situation wherein the auxiliary steering torque does not fall below a predefined minimum value, such that the auxiliary steering torque remains active.

2. The method of claim 1, wherein ascertainment of the present driving situation includes ascertaining a required total steering torque, necessary to move the motor vehicle along an intended driving path; and measuring a driver steering torque applied by a driver.

3. The method of claim 2, wherein ascertaining the required total steering torque includes ascertaining at least one curvature of the intended driving path and a present lateral deviation of the motor vehicle from the driving path and the total steering torque necessary to move the motor vehicle along the intended driving path includes a steering torque portion resulting from the deviation of the present driving path in relation to the intended driving path and from a steering torque portion which results from the curvature of the intended driving path.

4. A method for generating an auxiliary steering torque comprising:
    ascertaining and classifying a present driving situation into a driving situation category;
    generating an auxiliary steering torque based on said present driving situation; and
    wherein in a first driving situation the auxiliary steering torque is an amount such that a motor vehicle follows an intended driving path, in a second driving situation the auxiliary steering torque increases based on a steering torque applied by a driver, in a third driving situation the auxiliary steering torque reduces based on a steering torque applied by the driver, and in a fourth driving situation the auxiliary steering torque is an amount such that the auxiliary steering torque does not fall below a predefined minimum value.

5. The method of claim 4, wherein ascertainment of the present driving situation includes ascertaining a required total steering torque necessary to move a vehicle along an intended driving path; and measuring a driver steering torque applied by a driver.

6. The method of claim 5, wherein ascertaining the required total steering torque includes ascertaining at least one curvature of the intended driving path and a present lateral deviation of the motor vehicle from the driving path wherein the total steering torque necessary to move the vehicle along the intended driving path includes a steering torque portion resulting from the deviation of the present driving path in relation to the intended driving path and a steering torque portion that results from the curvature of the intended driving path.

7. A system for generating an auxiliary steering torque comprising:
    a lane sensor;
    a lane centering unit;
    a steering torque sensor;
    a driver steering torque adaptation unit providing an auxiliary steering torque, said auxiliary steering torque based on a present driving situation;
    a steering actuator receiving said auxiliary steering torque;
    the present driving situation is based on a required total steering torque necessary to move a vehicle on an intended driving path and a driver steering torque applied by a driver; and
    the present driving situation classified in a driving situation category including a first driving situation wherein the auxiliary steering torque is an amount such that a motor vehicle follows an intended driving path, a second driving situation wherein the auxiliary steering torque increases based on a steering torque applied by a driver, a third driving situation wherein the auxiliary steering torque reduces based on a steering torque applied by the driver, and a fourth driving situation wherein the auxiliary steering torque is an amount such that the auxiliary steering torque does not fall below a predefined minimum value.

* * * * *